No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

WITNESSES:
F. Stallman
D. Campbell

INVENTOR
George A. Cardwell
BY Edwin N. Brown
HIS ATTORNEY

No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

WITNESSES:
F. Stallman
D. Campbell

INVENTOR
George A. Cardwell
by Edwin H. Brown
HIS ATTORNEY

No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

WITNESSES:
F. Stallman
D. Campbell.

INVENTOR
George A. Cardwell
by Edwin N. Brown
HIS ATTORNEY

No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

WITNESSES:
F. Stallman
D. Campbell.

INVENTOR
George A. Cardwell
BY Edwin N. Brown
HIS ATTORNEY

No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

WITNESSES:
F. Stallman
D. Campbell.

INVENTOR
George A. Cardwell
BY
HIS ATTORNEY

No. 801,967. PATENTED OCT. 17, 1905.
G. A. CARDWELL.
MULTIPLEX SYSTEM OF TELEGRAPHY.
APPLICATION FILED FEB. 3, 1900. RENEWED FEB. 29, 1904.

| 124 | 142 | 143 | 124 | 121 | 141 | 234 | Chicago |
| 232 | 132 | 323 | 341 | 234 | 243 | 213 | New York |
| 121 | 214 | 123 | 121 | 232 | 341 |     | Albany |

*Fig. 18.*

| 121 = a | 212 = j | 312 = s | 343 = 1 |
| 123 = b | 213 = k | 313 = t | 412 = 2 |
| 124 = c | 214 = l | 314 = u | 413 = 3 |
| 131 = d | 231 = m | 321 = v | 414 = 4 |
| 132 = e | 232 = n | 323 = w | 421 = 5 |
| 134 = f | 234 = o | 324 = x | 423 = 6 |
| 141 = g | 241 = p | 341 = y | 424 = 7 |
| 142 = h | 242 = q | 342 = z | 431 = 8 |
| 143 = i | 243 = r |         | 432 = 9 |
|         |         |         | 434 = space |

*Fig. 19.*

| 242 | 241 | 314 | 121 | 321 | 314 | 121 | 241 | 242 |
| 242 | 141 | 314 | 123 | 124 | 232 | 132 | 123 | 341 |
| 141 | 123 | 314 | 134 | 131 | 142 | 134 | 141 | 342 |
| 342 | 121 | 314 | 214 | 123 | 214 | 121 |     |     |

*Fig. 16.*

WITNESSES:
F. Stallman
D. Campbell

INVENTOR
George A. Cardwell
BY
Edwin N. Brown
HIS ATTORNEY

UNITED STATES PATENT OFFICE.

GEORGE ALEXANDER CARDWELL, OF NEW YORK, N. Y., ASSIGNOR TO JOSEPH E. HEIMERDINGER, TRUSTEE, OF NEW YORK, N. Y.

MULTIPLEX SYSTEM OF TELEGRAPHY.

No. 801,967. Specification of Letters Patent. Patented Oct. 17, 1905.

Application filed February 3, 1900. Renewed February 29, 1904. Serial No. 195,895.

*To all whom it may concern:*

Be it known that I, GEORGE ALEXANDER CARDWELL, a citizen of the United States, residing in the borough of Manhattan, city, county, and State of New York, have invented certain new and useful Improvements in Multiplex Systems of Telegraphy, of which the following is a specification.

This invention relates to a system or method of transmitting a number (two or more) of messages over a telegraph-line simultaneously by utilizing electrical impulses in sets or groups, to each of which sets or groups of impulses is given a different meaning at different stations, so that two or more receiving-stations may therefore each receive the same sets of impulses, while owing to different translations of the electrical impulses at the different stations different meanings may be conveyed to the said different stations at the same time. For carrying out this general conception resort is most advantageously had to symbols, such as Morse's, in which the letters of the alphabet (in whole or in part) are represented each by sets or groups of elements, such as the three elements of a dot, a dash, and a space, which are the well-known elements of the symbols in the Morse system. The letters of the alphabet are formed by different sets or groups of two or more of these elements, except in the case of two letters which are formed each of only a single element—namely, a dot for "e" and a dash for "l." A set or group of impulses of the present invention in using the Morse symbols produces one such symbol in each receiver on the line, and the reception of the particular symbol intended for each station is effected by an appropriate translation by electrical connections at the receiving-station of the set or group of impulses transmitted. The translation can be effected automatically by operations electrically produced or controlled, so that indication can be given at each station only of the message for that station.

As one certain element would have to be received at one station simultaneously with the reception at another station or stations of a like or an unlike element, provision is made for transmitting over the line a number of sets or groups of impulses, of which sets or groups all will indicate said certain element at one receiving-station, but of which some will indicate the same element and some a different element at the other receiving station or stations. For example, supposing the dot, the dash, and the space are the elements composing letters and that only two receiving-stations are on a line, the dot at one receiving-station could be indicated indifferently by any one of three sets or groups of impulses, while at the other station one such set or group would indicate a dot, another set or group a dash, and a third set or group a space. If instead of dots, dashes, and spaces other forms of letter elements were used— say the numerals "1," "2," and "3"—the same system could be utilized. The number of different elements is not necessarily confined to three, the number of different sets or groups of impulses being decreased or increased accordingly. With only two receivers on a line one number may be the square of the other—that is to say, if use is made of two elements—for example, a dot and a space, or a dash and a space, or a dot and a dash, or the numerals "1" and "2," as may be desired—four groups of impulses will suffice— namely, one group to indicate the first element at both receivers, a second group to indicate the first element at the first receiver and the second element at the second receiver, a third group to indicate the second element at the first receiver and the first element at the second receiver, and a fourth group to indicate the second element at both receivers— while if three elements be used, including a space, nine groups of impulses will suffice, and so on, because with elements in groups of two only as many permutations are possible as are equal to the square of the number of elements. The number of receivers on a line may be more than two, the number of groups of impulses in any case being equal to the $n$th power of the number of elements, where $n$ represents a number of receivers. Thus for three receivers and three elements twenty-seven groups of impulses will suffice, as no more than twenty-seven permutations of three elements in groups of three are possible.

By increasing the number of elements the average number of elements to a letter can be diminished, while the number of the groups of impulses would be increased, and, on the other hand, by decreasing the number of elements the number of groups of impulses could be diminished, but the average number of elements required for producing a letter symbol would be increased. The user of the invention can choose between the advantages and disadvantages in any case, and it is considered to be most generally advantageous to employ three elements, especially if more than two receivers are to be used on a line.

In referring to the number of receivers or receiving-stations on a line here and elsewhere in this specification reference is made to those which receive different messages, all receivers or receiving-stations whereby or whereat the impulses are translated in the same sense being considered as one. Two receivers in the line means, therefore, that there are at least two receivers translating differently the same impulses.

While it is an advantage to translate the impulses automatically, it is not essential if the corresponding advantages are not desired, for each group of impulses might indicate itself the same at both or all the receiving instruments, and the operator at each instrument could translate according to his individual instructions, with or without the aid of a manually-operated instrument.

In the accompanying drawings, forming a part of this specification, and in which like characters of reference indicate like parts in all the figures.

Patent No. 673,315, issued to me April 10, 1901, illustrates and describes details of the construction herein referred to and not here fully illustrated.

Figures 1, 2:
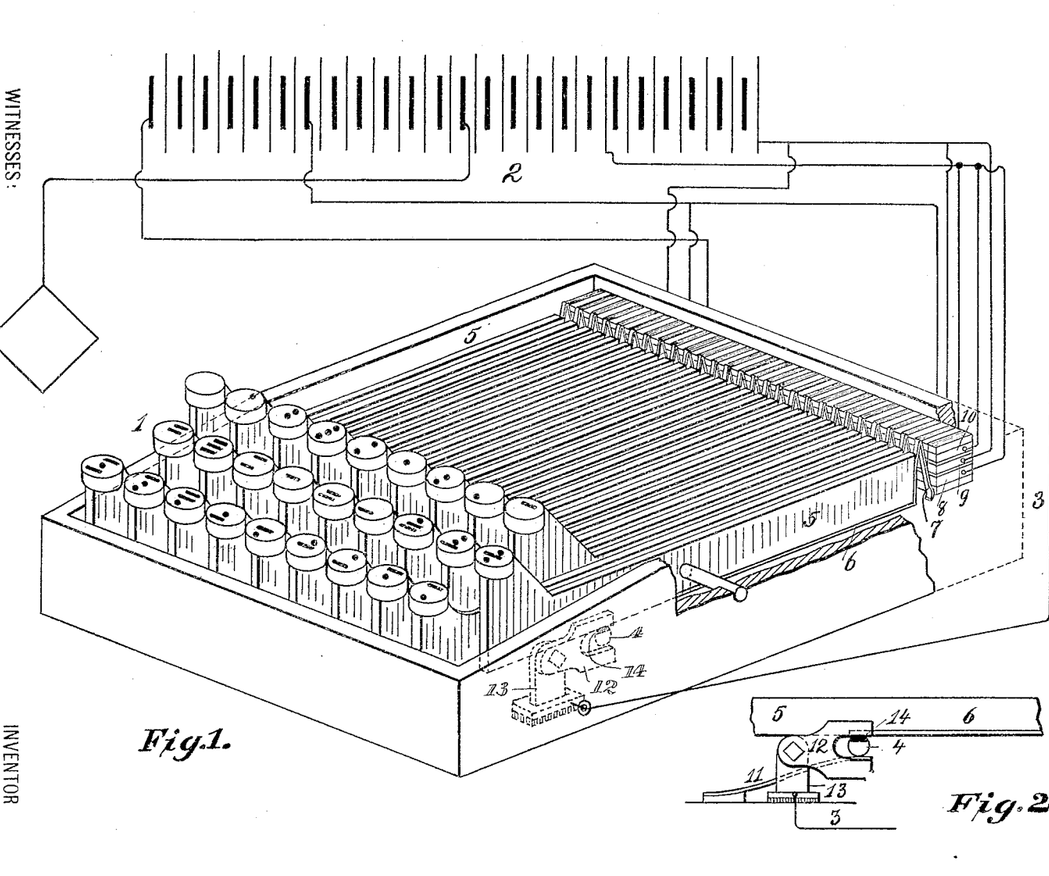
Figure 1 is a perspective view and diagram of one form of transmitter for carrying my invention into effect.
Fig. 2 is a side view of a detail of the same.

Referring to Fig. 1, the keyboard 1 and the battery 2 of a transmitting instrument at a sending-station are represented. The transmitting-battery 2 is shown as grounded at the middle and has conductors leading from both ends and from two intermediate points to the contacts of the keyboard. The purpose of this is to indicate that the keys of the keyboard can send over the normally opened main line 3 currents which are distinguished from each other by their strength or polarity, or both. When all the cells to the right of the ground-line are connected to the main line 3 by means of a key, a strong positive current will be sent over the main line; when a part only of these cells, a weak positive current will be sent. When all the cells to the left are connected to the main line 3, a strong negative current will be sent over the main line, and when part only of the left-hand cells are connected a weak negative current will be sent.

The main line 3 is connected with a metal rod 4, mounted in insulating-bearings. Each key 5, which may be made of wood or other insulating material, is provided with a conducting-strip 6, which is in metallic connection with the rod 4 and is provided at the inner end of the key with a spring-contact 7, so that when the outer end of any one key is depressed this contact sweeps over three metal contacts 8 9 10, of which contacts there is a set of three at the inner end of each key. These contacts, which are suitably insulated from each other, are arranged in a group extending across the inner end of the keyboard and are suitably connected with the battery 2 in the manner stated above. For example, the right-hand key 5 of the second row, Fig. 1, has opposite its inner end and in the path of its spring-contact 7 the contacts 8 9 10, of which the contacts 8 and 10 are both connected with an intermediate terminal in the right-hand cells of the battery 2, and the middle contact 9 is connected with the extreme right-hand terminal of the battery 2 and so that on the depression of the said key the set or group of impulses which it sends over the main line 3 consists, successively, of a weak positive, a strong positive, and a weak positive impulse. Each of the other keys has its individual spring-contact 7 opposite three corresponding contacts 8 9 10, which are so connected with the battery as to send a characteristic set or group of impulses, distinguished from every other set or group of impulses that can be sent by any other key by having one or more impulses differing in polarity or strength, or both, or in the case of two groups having the same number and kind of impulses by a different order of the impulses. The connections of one key only are shown, and the proper connection for the others will be understood without further illustration.

Figure 16:
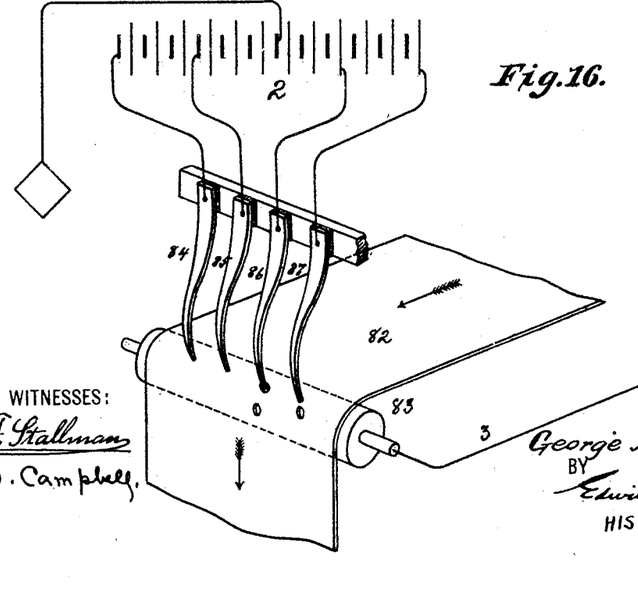
Fig. 16 is a diagrammatic view of an automatic transmitting instrument.

The rod 4, above referred to, is located below the keys 5, transversely to the same, and pressed against the bottom edges of the keys by a spring 11 at each end. This rod also passes between the prongs of a fork 12, pivoted on and electrically connected with a standard 13, which standard is connected with the main line 3, as shown in Fig. 2. This rod is provided in its top with a piece of insulating material 14, which normally rests against the top prong of the fork 12, the bottom prong of the fork being normally a sufficient distance below the rod 4 to break the electrical connection between said rod 4 and said fork 12, but near enough for the said electrical connection to be established by the depression of said rod 4 by any of the keys at or before the passage of the movable spring-contact 7 of said key over the first of the corresponding stationary contacts 8 9 10. When any one key 5 is depressed, it presses down the rod 4, which is thus brought into electrical contact with the lower prong of the fork 12 and then turns said fork on its pivot, while maintaining electrical contact therewith, the friction at the pivot preventing the independent motion of the fork. Thus the rod 4 is brought and maintained during its depression in electrical connection with the battery 2, the current passing from the rod 4 through the conducting-strip 6 and spring-contact 7 to the contacts 8 9 10, which in turn, as stated, are connected with the battery. When the depressed key is released, it is pressed upward by the rod 4, which in turn is pressed upward by its springs 11, and thus the contact between the rod 4 and the lower prong of the fork 12 is broken and remains broken during the ascent of the rod and return of the fork 12 to its normal position. The electric circuit is thus broken and the spring-contacts 7 can sweep back over the contacts 8, 9, and 10 into their original positions without producing any electrical effect whatever. Any arrangement for putting to line appropriate sets or groups of impulses can be used in carrying out the present invention. Even a keyboard is not absolutely essential, although it or any other transmitter which puts the proper impulses to line with little care or skill on the part of the transmitting operator effects a great advantage and special improvement. A transmitter is shown in Fig. 16 and will be hereinafter described in which with a properly-prepared tape the operation is entirely automatic.

Figure 3:
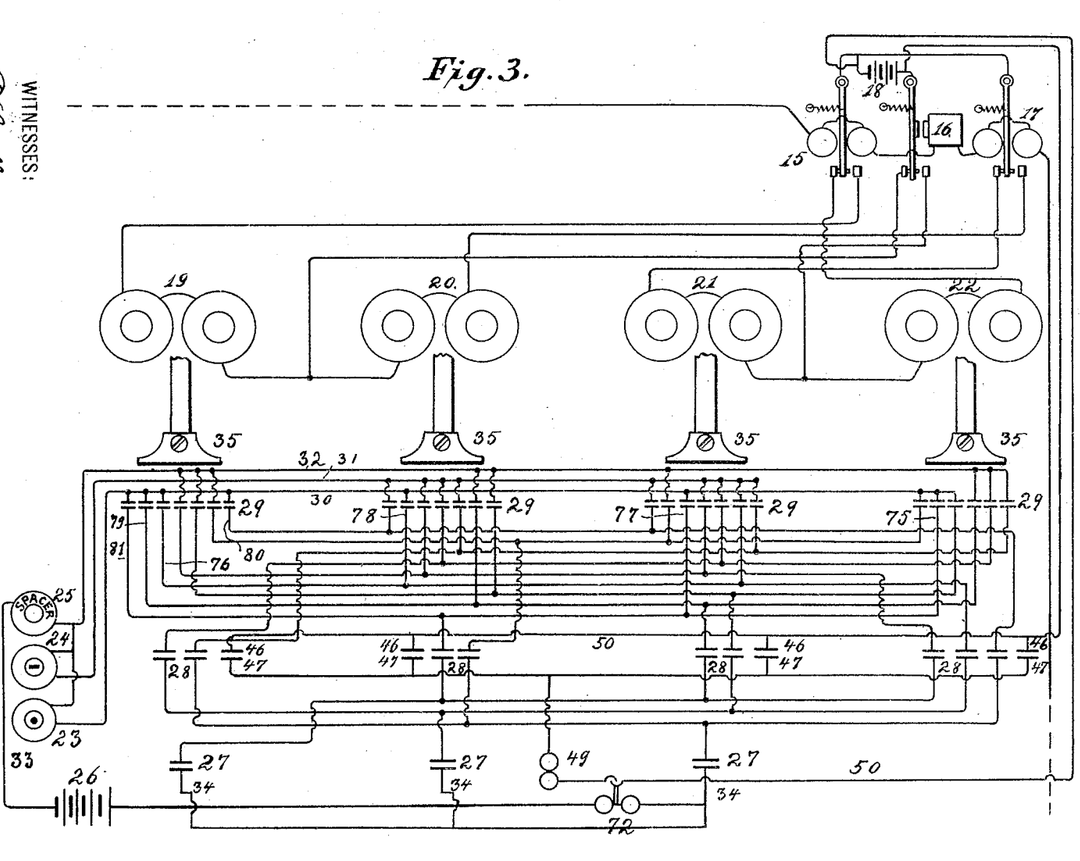
Figs. 3, 4, 5 are diagram views of the three receiving-stations.
Figure 4:
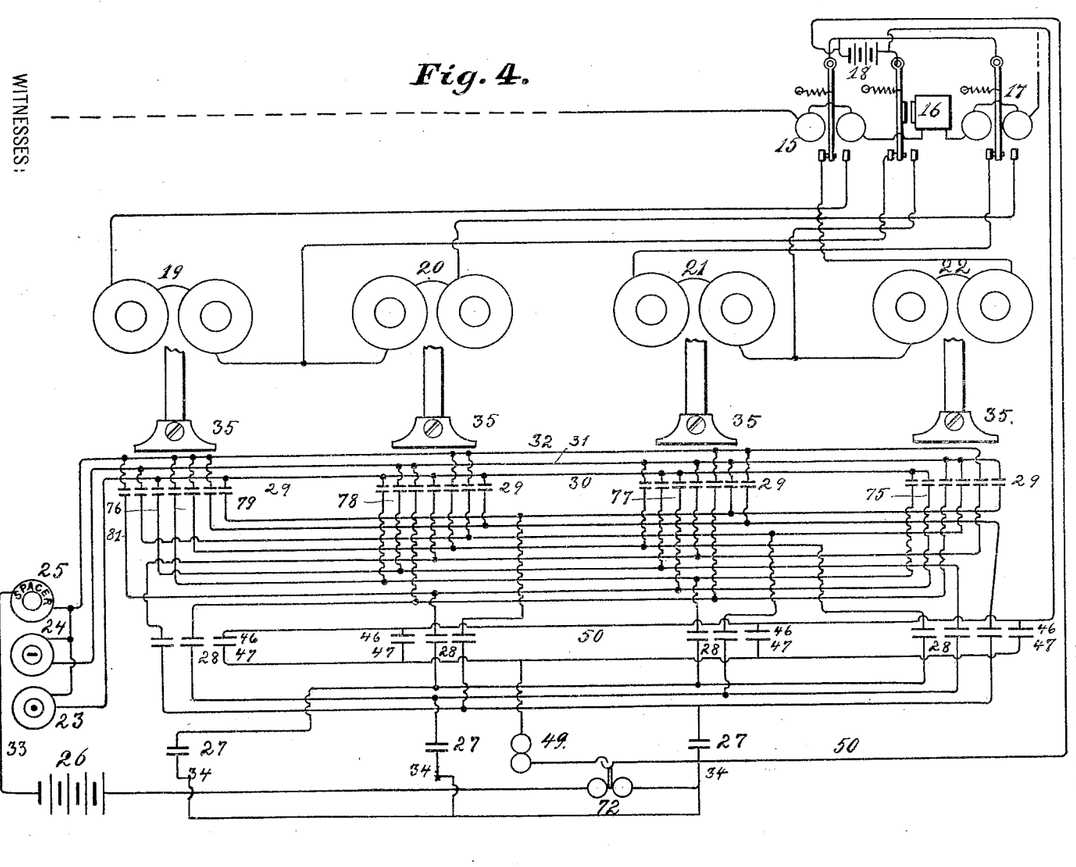
Figure 5:
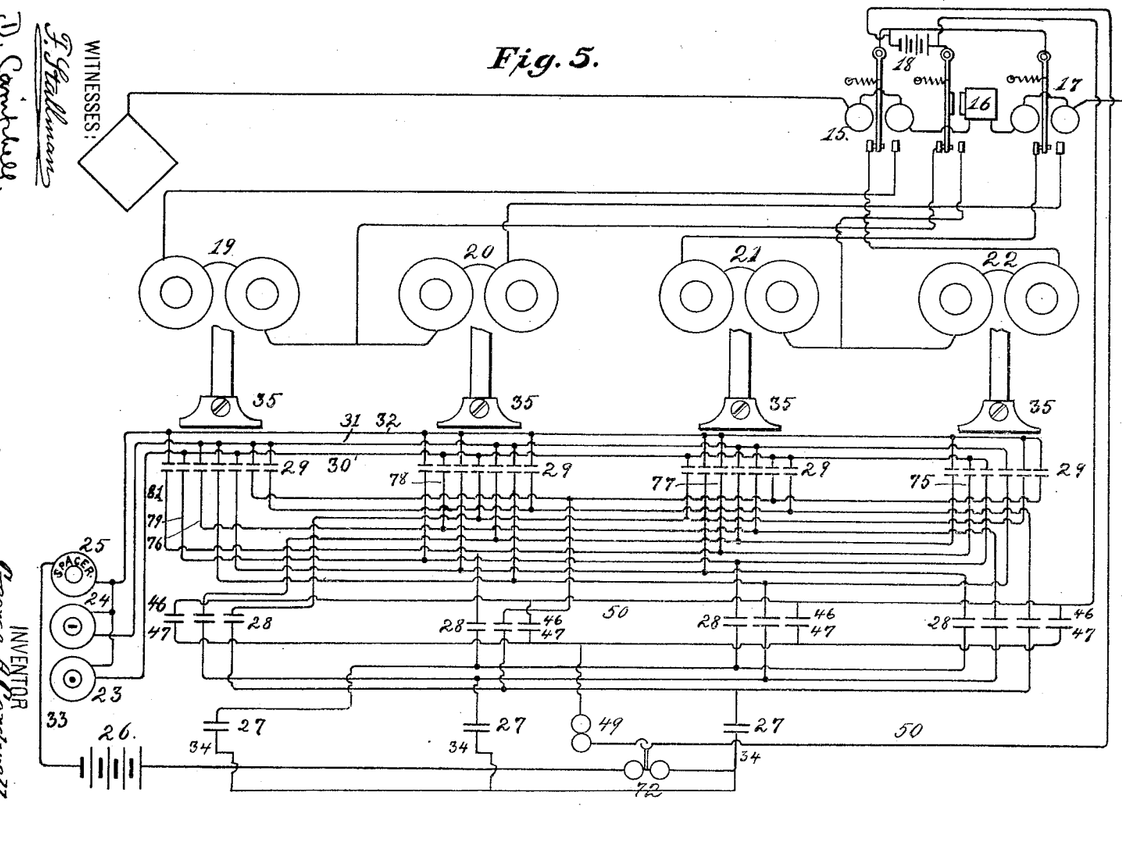

The three relay-electromagnets 15, 16, and 17 at each of the three receiving-stations may be identical and similarly connected and will be referred to hereinafter as the "selecting-magnets." In the drawings they are shown similarly connected, the positive pole of the local receiving-battery 18 being connected with the armature of the neutral selecting-magnet 16 and the negative pole of the same battery with the armatures of the two polarized selecting-magnets 15 and 17, and these latter armatures are so mounted as to respond to negative and to positive currents only, respectively. The neutral selecting-magnet 16 attracts its armature only when a strong current impulse, whether positive or negative, passes over the main line, and therefore when a strong positive current impulse passes over the main line the armatures of the neutral selecting-magnet 16 and the polarized selecting-magnet 17 at each of the receiving-stations are attracted to their front contacts. When a strong negative current impulse passes over the main line, the armature of the neutral selecting-magnet 16 and of the polarized selecting-magnet 15 are attracted at each station. When a weak positive current passes over the main line, the armature of the polarized selecting-magnet 17 only at each receiving-station is attracted, and when a weak negative current impulse passes over the main line the armature of the polarized selecting-magnet 15 only at each receiving-station is attracted. At each receiving-station there are four electromagnets 19 20 21 22, respectively, which might be termed "switch-magnets," but will be designated hereinafter as "selectable" magnets, and each of these selectable magnets has one end individually connected by wires with one contact of one of the polarized selecting-magnets 15 and 17, and the other ends of the four selectable magnets are connected in pairs by wires with the front and back contacts of the natural selecting-magnet 16. Thus by means of the three selecting-magnets the normally opened circuit of the local receiving-battery 18 at each receiving-station can be closed through any one of the four selectable magnets 19, 20, 21, and 22, according to the character of the main-line current impulse. The selectable magnet 19 is connected with the back contact of the neutral selecting-magnet 16 and with the front contact of the polarized selecting-magnet 15, which responds to negative main-line impulse only and is therefore energized whenever a weak negative impulse on the main line causes the polarized selecting-magnet 15 to attract its armature without affecting the positions of the armatures of the other selectable magnets at the same receiving-station. The selectable magnet 20 has one end connected with the back contact of the neutral selecting-magnet 16 and with the front contact of the polarized selecting-magnet 17, which responds to positive main-line impulses only, and therefore a weak positive current impulse over the main line closes the circuit of the local receiving-battery 18 through the selectable magnet 20 only without affecting the positions of the armatures of the other selectable magnets at the same receiving-station. The selectable magnet 21 has one end connected with the front contact of the neutral selecting-magnet 16 and the other end connected with the back contact of the polarized selecting-magnet 17, which responds to positive current impulses over the main line only, and therefore a strong negative current impulse over the main line closes the circuit of the local receiving-battery 18 through the selectable magnet 21 only without affecting the positions of the armatures of the other selectable magnets at the same station. The selectable magnet 22 has one end connected with the front contact of the neutral selecting-magnet 16 and the other end with the back contact of the polarized selecting-magnet 15, which responds to negative currents only, and therefore a strong positive current impulse over the main line closes the circuit of the local receiving-battery 18 through the selectable magnet 22 only without affecting the positions of the remaining selectable magnets.

In connection with the four selectable magnets 19, 20, 21, and 22 at each receiving-station recording instruments 23 24 25, comprising three electromagnets, a recording-battery 26, a system of divided and subdivided branches connected with the said battery and the recording instruments 23 24 25, are used, and these branches are provided with three sets of gaps 27 28 29, to be closed successively in the manner to be described hereinafter by means of switches operated and controlled by the selectable magnets 19, 20, 21, and 22. Starting from one pole, the positive one as shown, of the recording-battery 26, the circuit is divided into branches each having a gap at 27, and each of these branches is divided into subbranches, (three for each branch,) as shown, with a gap in each subbranch at 28, and each of these subbranches is subdivided into further subdivisions (three for each subbranch as shown) with a gap at 29 in each subdivision of each subbranch. Beyond the gaps 29 the subdivisions of the subbranches are united into three branches 30, 31, and 32, respectively, the first two of which include, respectively, the recording instruments 23 and 24, while all the three branches 30, 31, and 32 are united in the conductor 33, which leads to that pole of the recording-battery opposite the one connected with the three branches 27, and such conductor 33 also includes the third recording instrument 25. No material difference is shown at the different receiving-stations in the branches, subbranches, and subdivisions of the subbranches with the gaps therein; but the branches 30, 31, and 32 are differently connected with the said subdivisions of the subbranches at the different receiving-stations in order that a given set or group of main-line current impulses may produce different effects in the different receivers. The subdivisions of the subbranches are grouped at each receiving-station into groups which correspond, respectively, with the selectable magnets 19, 20, 21, and 22, so that a switch controlled by each of said magnets can close simultaneously all the gaps 29 in the group of subdivisions of subbranches pertaining to such selectable magnets. The subbranches are also divided into groups which correspond, respectively, with the selectable magnets 19, 20, 21, and 22, so that a switch controlled by each of said magnets can close simultaneously all the gaps 28 in the group of subbranches pertaining to such selectable magnet. Only three branches 34 are shown, and the gap 27 of each is closed by a switch operated by the corresponding selectable magnet. Four branches, each with a gap 27, could be used, and the number of subbranches and their number of subdivisions increased; but as only twenty-seven sets or groups of current impulses are necessary three branches, with their subbranches and the subdivisions of the subbranches, are sufficient. As stated, the gaps 27 28 29 in the branches, subbranches, and subdivisions of subbranches pertaining to the selectable magnet 19 are closed and controlled by switches operated by said selectable magnet, and in a like manner the switches to close the gaps 27 28 29, or 27 28, pertaining to each of the other magnets 20 21 22, are controlled by these magnets, respectively, and the closure of a group of gaps 29 remains only as long as the corresponding selectable magnet is energized. For a group of gaps 28 a lock or detent holds the switch closed after the corresponding selectable magnet has effected a closure and has been deënergized. When a gap 27 is closed, the closure continues after the selecting-magnet which effected the closure has been deënergized, and, furthermore, a cut-off of any suitable construction is combined with the selectable magnets 19 20 21 and their circuits for preventing the closure of more than one of said gaps 27 at a time. A suitable form and construction of such switches and cut-out will now be described.

Figure 6:
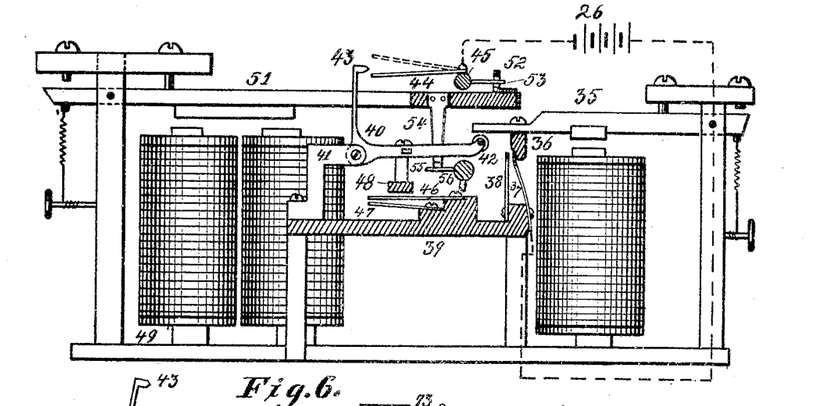
Fig. 6 is a side view of one construction of the switch-locking and cut-out mechanism for a receiving-station.

Each selectable magnet 19, 20, 21, and 22 is provided with an armature 35, Fig. 6, mounted in a well-known manner. This armature 35 carries a transverse bar 36 of insulating material, and below the same a group of pairs of spring-contacts 37 and 38 is provided, which contacts are fixed on a plate of insulating material 39. These spring-contacts 37 and 38 serve for closing the gaps 29 and are therefore located in the subdivisions of the subbranches—that is to say, the spring-contacts 37 are connected with the branch wires 30, 31, and 32, and the spring-contacts 38 are connected with the switches for closing the gaps at 28 in the subbranches. There are seven pairs of such spring-contacts 37 38 below each of the selectable magnets 19 20 21 and six pairs below the armature of the selectable magnet 22 in the example shown in the drawings to make up the twenty-seven gaps 29. When an armature 35 descends, it presses the spring-contact 37 below it against the opposite spring-contacts 38, and thus closes the gaps 29 pertaining to this selectable magnet, as is shown in Fig. 6.

Near the free end of each armature 35 an L-shaped detent-lever 40 is pivoted on a standard 41 on the insulating-plate 39, the lower arm of said L-shaped detent-lever 40 carrying a roller 42, which rests against the under side of the armature 35, and the other upwardly-extending arm of this L-shaped detent-lever 40 is formed with a hooked end 43 to make said lever a detent, which can engage and hold a spring-contact 44, projecting from a rock-shaft 45, extending transversely over the armatures 35 of the several selectable magnets 19, 20, 21, and 22, there being one spring-contact 44 for each of such magnets. This rock-shaft 45 is to be mounted and suitably insulated in proper bearings. Below the armature 35 of each selectable magnet a group of spring-contacts 46 47 is fixed in pairs on the insulating-plate 39 in such a manner that the upper spring-contacts 46 can be pressed against the lower spring-contacts 47 by a bar 48, of insulating material, extending transversely across the upper spring-contacts 46 and resting upon them, and this bar is connected with the lower or horizontal arm of the L-shaped detent-lever 40.

An electromagnet 49 is included in a shunt-circuit 50 of the local receiving-battery 18 and is provided with an armature 51, mounted in the usual way. A slotted plate 52 projects upward from the armature 51 near the free end of the same, and a pin 53 extends into a vertical slot of said plate from the rock-shaft 45, so that when the armature 51 of the shunt-magnet 49 is attracted the rock-shaft 45 is turned axially and swings up all the spring-contacts 44 except the one which is held locked by the hooked end 43 on the L-shaped detent-lever 40, as appears in dotted lines in Fig. 6, thus forming a cut-out for all the switches formed by the said spring-contacts 44 and hooked ends 43 of the L-shaped detent-levers 40 excepting the one pertaining to the selectable magnet first energized.

Figures 7, 8:
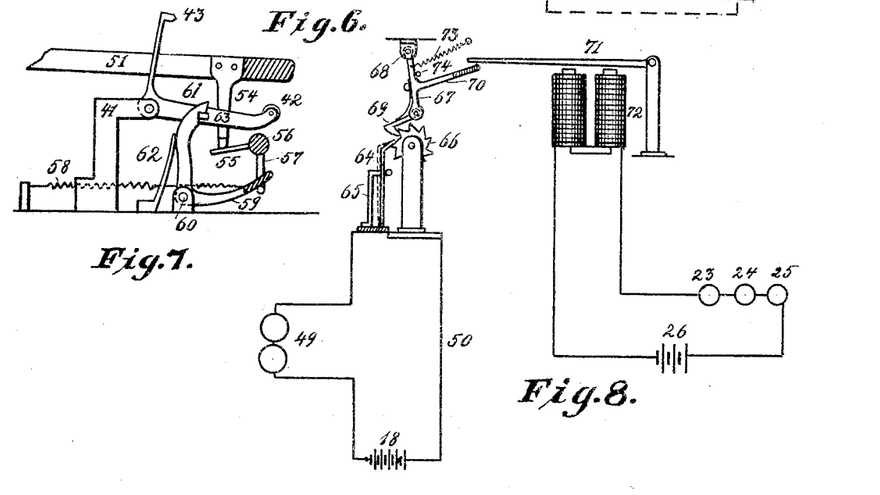
Fig. 7 is a detail view of parts of the same.
Fig. 8 is a diagram view of the mechanism for breaking the shunt-circuit after each impression.

The armature 51 has a downwardly-extending arm 54, which rests on a radial arm 55 of a rock-shaft 56, also mounted in insulated bearings and having as many downwardly-extending arms 57 as there are L-shaped detent-levers 40, and one of these arms 57 is connected with a helical spring 58, also attached to the frame of the instrument, Fig. 7. The lower end of each arm 57 is bent laterally under the insulated end of the lower arm of an L-shaped lever 59, of which there is one under each L-shaped detent-lever 40, the said L-shaped levers 59 being pivoted at 60. The upper end of the upwardly-projecting arm of each L-shaped lever 59 is provided with a shoulder forming a hook 61, and this hook can be pressed by a spring 62, bearing on the L-shaped lever 59, against a laterally-projecting stud 63 on the lower arm of the corresponding L-shaped detent-lever 40. The spring 58 is more powerful than the several springs 62 combined. When any one of the four selectable magnets is energized and its armature 35 attracted, this armature presses down on the horizontal arm of the L-shaped detent-lever 40 below it and by means of the bar 48, of insulating material, presses the corresponding spring-contacts 46 against the spring-contacts 47. One pair of the spring-contacts 46 47 at each selectable magnet is included in the shunt-circuit 50 of the local receiving-battery 18, as shown, and, as stated above, the shunt-magnet 49 is included in this shunt-line, and thus this shunt-magnet 49 is energized by the shunt-circuit current as soon as any one of the selectable magnets is energized, as by the energizing of any one of the selectable magnets the shunt line-circuit is completed at such selectable magnet. At the same time that the armature of the energized selectable magnet presses the spring-contacts 37 against the spring-contacts 38 it presses down the lower arm of the L-shaped detent-lever 40, causing the hooked end 43 on the upper end of this lever to engage the corresponding spring-contact 44, whereby the gap 27 of this selectable magnet is closed. As the descending armature 51 of the shunt-magnet 49 turns the rock-shaft 45 axially it swings up all the other spring-contacts 44, thus preventing the closing of the 27 gap of any other selectable magnet, even if such other selectable magnet is energized. The switch formed by the spring-contact 44 and L-shaped detent-lever 40 remains locked as long as the shunt-circuit 50 remains closed. As the shunt-magnet armature 51 moves down it turns the rock-shaft 56 axially by means of the arms 54 55, and thereby the several arms 57 on said rock-shaft are swung to the right, Fig. 7, thus permitting the springs 62 to throw the upwardly-extending arms of the L-shaped levers 59 to the right.

As soon as the stud 63 of any L-shaped detent-lever 40 that has been pressed down by the armature 35 above it arrives at the shoulder forming the hook 61 on the upper end of the corresponding L-shaped lever 59 this hooked end snaps over the stud 63, and thus locks the L-shaped lever 59 in lowered position, and thereby locks the spring-contacts 46 and 47, pertaining to this selectable magnet, in closed position—that is to say, the switch for closing the gaps 28, pertaining to the said selectable magnet, is closed and locked and remains locked as long as the shunt-circuit remains closed, and it also keeps the shunt-circuit closed at this point. It is thus evident that if any one of the selectable magnets is energized and its armature attracted, that, first, the spring-contacts 37 38 for closing the gaps 29, corresponding to this selectable magnet, are brought in contact but immediately opened again as soon as the magnet is deënergized and its armature moved upward by the spring acting on the same; second, that the spring-contacts 46 47, forming the switch for closing the gaps 28, pertaining to this selectable magnet and for closing the shunt-line, are brought in contact and locked without, however, cutting out or affecting any other switches of the gaps 28 of the other selectable magnets, at the same receiving-station, and, third, that the switch for closing the gap 27, pertaining to this selectable magnet, is closed by the engagement of the corresponding L-shaped detent-lever 40 and spring-contact 44 and is locked, and at the same time the switches for closing the gaps 27, pertaining to the other selectable magnets, are cut out. There being, as shown, no branch with a gap 27 therein opposite the selectable magnet 22, the latter need have no spring-contacts 46 47, so that it would control only the switches for the gaps 28 and 29 and would not and could not cut out any of the switches for the gaps 27. Moreover, since, as shown, the selectable magnet 22 is not to be operated by the first impulse of a set or group of impulses the means for locking the switches of its gaps 28 may or may not be in action independent of the other selectable magnets. As thus far described, therefore, on the passage of a current impulse over the main line it operates to close the circuit of the local receiving-battery 18 at each receiving-station through one or the other of the four selectable magnets 19, 20, 21, and 22, the particular selectable magnet selected, and consequently energized, being determined by the character of the impulse, as weak positive, weak negative, strong positive, or strong negative. The particular selectable magnet selected is therefore energized by the local receiving-battery 18 and operates its switches practically simultaneously, as described above, and closes all the gaps 27, 28, and 29 pertaining to it, and its cut-out prevents the closure of the gaps 27 pertaining to other selectable magnets—that is, it prevents the completion of any branches in which such other gaps 27 are located until all the gaps have been opened again. No circuit of the recording-battery can be completed by the effect of this first current impulse because the subbranches of the branch which has been closed at its gap 27 are all open at gaps 28, pertaining to their magnets, as the electrical connections at the receiving-stations are made accordingly. On the cessation of the first main-line current impulse the armatures of the selecting magnet or magnets return to their normal positions and the circuit of the local receiving-battery 18 is thus broken, so that the selectable magnet which has just been energized is deënergized and again opens the gaps 29, which have been temporarily closed; but this deënergizing of the selectable magnet does not open the gaps 28 and 27, because they are held closed by the lock previously described, nor does this deënergizing affect the cut-out, which remains in position to prevent the closing of any other gap 27.

On the passage over the main line of the second current impulse of the group of such current impulses differing in polarity or strength, or both, from the impulse preceding it one or two of the selecting-magnets 15 16 17 are so affected as to close the circuit of the local battery through another one of the selectable magnets at each receiving-station. The second selectable magnet so energized would close all the gaps pertaining to it excepting the gap 27, which cannot be closed, as the switch for closing it is cut out and the second impulse causes only the closing of the gaps 28 and 29, pertaining to the said second selectable magnet selected. The closure of these switches completes at 28 the gaps in one of the subbranches of the branch which the first impulse closed at 27; but it does not complete any circuit, because the gaps 29, corresponding to the selectable magnet under consideration—that is, the second selectable magnet energized—are all in subdivisions of the subbranches open at gaps 28 or if any subbranches have been closed at 28 of branches open at 27. On the cessation of this second main-line current impulse the armatures of the selecting-magnets return to their normal positions, the selectable magnet which has thus been energized through the second current impulse over the main line is deënergized, and the gaps 29, pertaining to this second selectable magnet, are opened; but the gaps 28 pertaining to the second selectable magnet, which gaps have just been closed, remain closed, as they are locked in the manner previously described.

On the passage over the main line of the the third impulse of a group, which impulse should be in character unlike the second impulse and may be like or unlike the first, one or two of the selecting-magnets 15 16 17 are operated and closed, the circuit of the local receiving-battery 18 through the corresponding selectable magnet is closed, which selectable magnet should be different from the second one energized, but may be the one first energized, or a different one. The gaps 29, pertaining to this third energized selectable magnet, are closed, as are also the gaps 28, pertaining to this third selectable magnet, if not closed previously, with the result that by the closure of the gaps 29 of this third selectable magnet the circuit of the recording-battery 26 is completed through one or the other of said gaps 29 by way of one or the other of the branches 30, 31, and 32. On the cessation of this third main-line current impulse the armatures of the selecting-magnets return to their normal positions, and the third operated selectable magnet is deënergized and opens the gaps 29 pertaining to it. When this occurs, the gaps 27 and 28 are all opened and the cut-out withdrawn by means of a circuit-breaker, which breaks the shunt-circuit, and is controlled by the completion of the circuit of the recording-battery 26. Suitable devices for breaking the circuit of the shunt-line may be provided, and one construction of such device is shown in Fig. 8 and will now be described.

Within the shunt-circuit 50 are arranged two contacts 64 and 65, of which the former is a spring-contact and has its upper end rested against a ratchet-wheel 66. The upper end of the contact 65 is bent to extend across the spring-contact 64, which by its spring tension is normally held against the bent end of the contact 65. A lever 67, pivoted at 68, carries a spring-pawl 69, engaging the ratchet-wheel 66, and this lever 67 is provided with an arm 70, on which the armature 71 of an electromagnet 72, included in the circuit of the recording-battery 26 can act. A spring 73 pulls the lever 67 in the direction toward the right, Fig. 8, against a suitable stop 74. When the circuit of the recording-battery 26 is closed, the armature 71 of the electromagnet 72 is attracted, whereby the pawl 69 is swung to the left. As soon as the last current impulse over the main line of a group of impulses ceases to act on the selecting-magnets the circuit of the local receiving-battery 18 is broken, and thus the armature of the last selectable magnet selected is raised, and the printing-circuit just completed is broken at the 29 gap, and thus the armature 71 is released from the electromagnet 72, which is included in the recording-battery, the circuit of which has just been broken. This permits the spring 73, which was brought in greater tension by the downward movement of the armature 71, to contract and throw the lever 67 to the right, causing its pawl 69 to turn the ratchet-wheel 66 the distance of one tooth and causing another tooth of this ratchet-wheel to move the spring-contact 64 away from the bent end of the contact 65 for an instant, whereby the shunt-line circuit is broken and the armature 51 of the shunt-magnet 49 in the shunt-circuit is released, permitting its spring to throw it upward. Thereby the locks of the switches closing the gaps at 28 and 27 are opened and all parts returned to the original positions that they had before the first current impulse was sent over the main line, and are now ready to respond to another set or group of impulses over the main line.

The operation as so far described takes place at all the receiving-stations. The difference is that the same set of impulses which closed the circuit of the recording-battery 26 at one receiving-station through a given branch 30, 31, or 32 may close the circuit of the recording-battery at one or both the other receiving-stations through the same branch or through a different branch, as provision has been made for response at each receiving-station to any one of as many sets or groups of impulses as there are permutations of the three elements represented, respectively, by the branches 30, 31, and 32. As before mentioned, for three elements only twenty-seven permutations are necessary, and twenty-seven gaps 29 in as many subdivisions of the circuit of the recording-battery 26 are shown. Any known or suitable electrical apparatus may be used at each receiving-station which will suffice to complete a circuit through any one of the seven subdivisions; but the apparatus described is believed to be the best for the purpose. At the first receiving-station the branch 30 is shown connected with nine of the subdivisions "29"—namely, four pertaining to the selectable magnet 19, one to the selectable magnet 20, one to the selectable magnet 21, and three to the selectable magnet 22. At the second receiving-station three of the corresponding subdivisions (marked 75, 76, and 77 at each receiving-station) are connected with a corresponding branch 30, while at the third receiving-station three of the corresponding subdivisions (marked 75, 78, and 79) are connected with the corresponding branch 30, and one of the last-mentioned three—that is, the one which is designated by 75—is the same as one of the three at the second station. When that set or group of impulses is sent over the main line, which closes the circuit of the recording-battery 26, through the "29" subdivision 75 at each receiver, which subdivision 75 at each receiver is connected with a branch 30, the recording instrument 23 is operated at all three receiving-stations, so that at all three receiving-stations the same symbol element is produced; but if another set of impulses be sent, so that the circuit of the recording-battery 26 is completed at each station through a "29" subdivision which leads at the first and second receiving-stations, but not at the third, to a branch 30, then the same symbol element will be produced at the first and second stations, but a different symbol element at the third. The nature of this different symbol element produced at the third station depends upon which of the "29" subdivisions (76 leading to the branch 31 at the third receiving-station or 77 leading to the branch 32 of this station) forms part of the circuit of the printing-battery at this station. If a set of impulses be sent over the main line 3 to complete a circuit through one of the two subdivisions 78 or 79, which are connected with the branch 30 at the first and third stations and with the branches 31 and 32, respectively, at the second receiving-station, then the same symbol element will be produced at the first and third station, but a different symbol element at the second, the nature of this different symbol element at the second station depending upon which of the subdivisions "29" (78 or 79) forms part of the closed circuit of the recording-battery 26 at the second station. By these five subdivisions "29," (75 to 79,) therefore, and connection with their subbranches, branches, switches, and cut-outs the recording-instrument 23 can be operated at each of the three receiving-stations, or it can be operated at the first and second stations in conjunction with the producing at the third station of either of two symbol elements, or this recording instrument 23 can be operated at the first and third stations and either of two different symbol elements made at the same time at the second station. There remain then four subdivisions connected with the branch 30 and the recording instrument 23 at the first receiving-station. Two of these are connected with the branch 31 at the second station and with the branches 31 and 32, respectively, at the third station, while the remaining two (80 and 81) are connected with the branch 32 at the second station and with the branches 31 and 32, respectively, at the third receiving-station. In the same manner there are nine subdivisions "29," which are connected with the branch 31 at the first receiving-station and of which some are connected with the said branch 31 and some with the branches 30 and 32 at the second and third receiving-stations, and there are nine subdivisions "29" remaining out of the total of twenty-seven, which are connected with the branch 32 at the first receiving-station, and some of them with the said branch 32, and some with the branches 30 and 31 at the second and third receiving-stations, so that every possible tendency for sending like or unlike symbol elements simultaneously to the three receivers is provided, for the symbol elements which are at the receiving-stations by the completion of the circuit of the recording-battery 26 over the branches 30, 31, and 32, respectively, can be of any suitable description; but, as shown, two marks, a dot and a dash and a space, the elements of the simplest of the ordinary Morse alphabet, are provided for. The recording instrument 23 may produce the dot, the recording instrument 24 the dash, and the recording instrument 25 the space, and since the paper or receiving-tape is to be moved each time a symbol element is made the recording instrument 25 is included in that part 33 of the circuit which is common to the three branches 30, 31, and 32.

The tape may be supported by any ordinary or suitable means, and the tape-feeding device can be connected with the armature of the recording instrument 25 in any known or suitable way. The manner of sending three messages over the same wire in the same direction to be received by three different receiving-stations by the method herein described and illustrated may be as follows: A message is handed in at the sending-station and an operator familiar with the Morse alphabet writes it out in Morse symbols by hand or machine on ruled or unruled paper, as illustrated in the top line of Fig. 10. The word "Chicago" is there given in Morse symbol elements as the first word of the message. Other words follow in the same symbol elements. The message in ordinary letters might or might not be written by the operator, and, if written, would serve as a check. As shown, the symbol elements for each symbol or letter are divided by double space. Another message is handed in at the same sending-station and an operator writes it in Morse symbol elements directly under the first message, element for element, including the double space between the symbols, as indicated by the second horizontal line of Fig. 10, where the words "New York" are the first word of the message.

All symbols should be commenced at the same point; but with a system using a different number of symbol elements for different symbols it is better to write each message independently. A third message is handed in, and at the same receiving-station an operator writes it in Morse symbol elements directly under the first and second messages, as indicated on the third horizontal line of Fig. 10, wherein the word "Albany" is the first word of the message.

Figure 10:
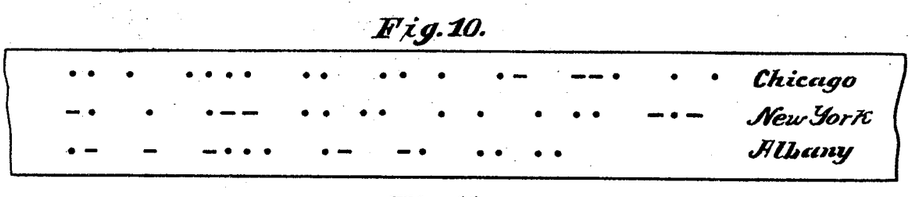
Fig. 10 is a view of a tape with three messages indicated thereon as a guide for the transmitting operator.

For transmitting, an operator having the paper with the three messages in Morse symbol elements, as in Fig. 10, and observing the first vertical column of symbol elements, consisting, as shown, of a dot, a dash, and a dot, depresses the key 5 of the keyboard, which bears the same Morse symbol elements in a vertical column—that is, a dot, a dash, and a dot. As shown in Fig. 1, this is the right-hand key of the second row. A depression of this key sends over the main line 3 a group of current impulses consisting of a weak positive, a strong positive, and a weak positive current. As the weak positive-current impulse takes effect on the selecting-magnet 17 at each receiving-station, the circuit of the local receiving-battery 18 at each receiving-station is completed through the selectable magnet 20, which immediately closes its switches in the manner previously described and closes all those gaps 27 28 29 that pertain to it. At the same time it operates a cut-out, as described, to prevent the subsequent completion of the circuit of the recording-battery 26 through either of the twenty-seven branches opposite the other selectable magnets 19 and 21 until the cut-out shall have been withdrawn, as has been described. As this first weak positive impulse over the main line 3 ceases the armature of the selecting-magnet 17 at each receiving-station returns to its normal position and the selectable magnet 20 at each receiving-station is deënergized and allows the retraction of the armature which closed the gaps 29, pertaining to such selectable magnets. Thereby the gaps 29 pertaining to the selectable magnet 20 at each receiving-station are opened; but the gaps 28 and 27 are kept closed by the means described. The strong positive impulse—that is, the second impulse of the group of three that passes over the main line 3—takes effect on the selecting-magnets 16 and 17 at each receiving-station and completes the circuit of the local receiving-battery 18 through the selectable magnet 22 at each receiving-station, which immediately operates its switches to close the gaps 29 28 pertaining to said selectable magnet 22. On the cessation of this second main-line impulse the armatures of the selecting-magnets 16 and 17 return to their normal position at all receiving-stations, the selectable magnets 22 are deënergized, the gaps 29 pertaining thereto are reopened; but the gaps 28 pertaining to such selectable magnets 22 are locked by the detents or locking means described. A weak positive impulse follows immediately over the main line and is the third and last impulse of a group of three and energizes the selecting-magnet 17 at each receiving-station, so that the circuit of the local receiving-battery 18 at each receiving-station is closed through the selectable magnet 20, and the latter immediately closes the gaps 29 pertaining thereto.

Figure 11:
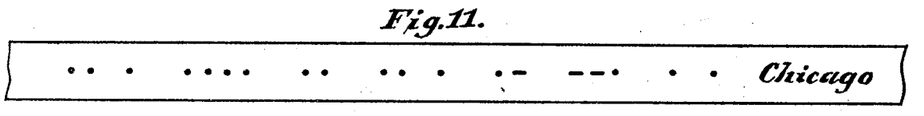
Figs. 11, 12, and 13 are views of the several receiving-tapes after the messages indicated in Fig. 10 have been recorded on them, respectively.
Figure 12:
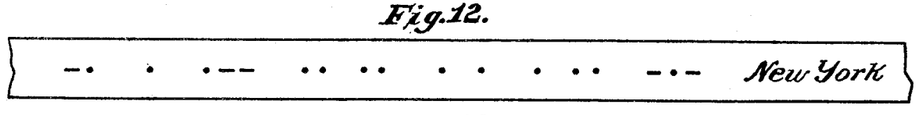
Figure 13:
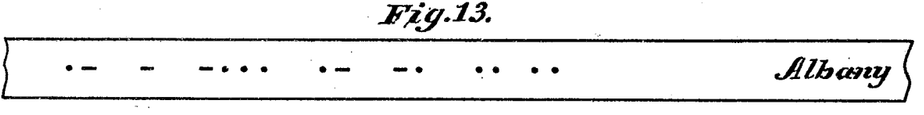
Figure 14:
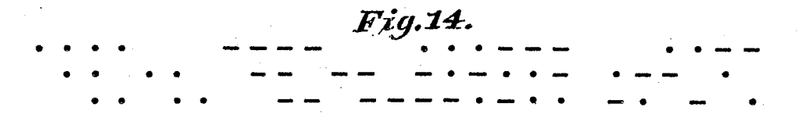
Fig. 14 is a chart showing in vertical columns all possible permutations of the dot, dash, and space.
Figure 15:
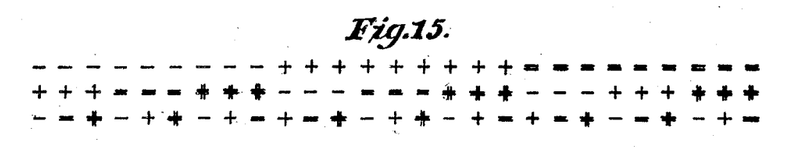
Fig. 15 is a similar chart showing permutations of positive and negative, strong and weak, currents corresponding column by column with the permutations of Fig. 14.

The gaps 28 and 27 pertaining to the selectable magnet 20 at each receiving-station have been closed by the first weak positive impulse of the groups of three impulses sent over the main line by the depression of the right-hand key 5. By the closing of the gaps 29 through the influence of the third and last impulse over the main line the recording-battery circuit at each receiving-station is completed through the subdivision 29 78 at each receiving-station. At the first receiving-station this subdivision 78 is connected with the branch 30, and therefore the recording-magnet 23 is energized by the current of the recording-battery 26 at this first receiving-station and produces a dot on the receiving-tape at this first receiving-station, as shown at the left-hand end of Fig. 11. At the second receiving-station the subdivision 78 is connected with the branch 31, which includes the recording-magnet 24, and therefore a dash is produced on the tape at this second receiving-station, as shown on the left-hand end of the tape, Fig. 12. At the third receiving-station the subdivision 78 is connected with the branch 30 and the recording-magnet 23, and therefore a dot is produced at this third receiving-station, as shown on the left-hand end of Fig. 13. The completion of the circuit 33 of the recording-battery 26 withdraws the switch-lock and cut-out at each receiving-station, as described, and all the gaps 27, 28, and 29 being opened the instrument at each receiving-station is ready for a new operation. As the current from the recording-battery 26 also energizes the recording instrument 25 the receiving-tape at each station is fed the necessary distance for the next symbol. Having thus recorded the first symbol at each receiving-station of the message destined for such receiving-station, the transmitting operator releases the key which he has just depressed and depresses another key, which will send over the main line the set or group of current impulses which will record a dot at the first receiving-station, a dot at the second receiving-station, and a dash at the third receiving-station. Which key is to be depressed can be determined by the connections of the stationary contacts of the respective keys with the battery at the sending-station. These connections are all fixed beforehand, and the operator has simply to depress the properly-marked key, as each key bears a mark corresponding to the Morse symbol elements, which are produced by the impulses sent successively over the main line by the depression of the said key. For example, the second key depressed—that is, the one that records a dot at the first receiving-station, a dot at the second, and a dash at the third—will send over the main line first a weak positive current, then a strong positive current, and then a weak negative current. By comparison of Figs. 14 and 15 appropriate sets of impulses for all permutations of the symbol elements with the connections shown in Figs. 3, 4, and 5 at the respective receiving-stations between the subdivisions 29 and the branches 30, 31, and 32 can be seen. Thus a dot, a dash, and a dot make the seventeenth vertical column in Fig. 14, and the seventeenth vertical column in Fig. 15 shows a single line plus designating a weak positive impulse, a double line plus indicating a strong positive impulse, and a single line plus indicating a weak positive impulse, and as seen above this set or group of impulses records a dot at the first receiving-station, a dash at the second receiving-station, and a dot at the third. The sixteenth vertical column in Fig. 15 is formed of a dot, a dot and a dash, and the sixteenth vertical column in Fig. 15 indicates a weak positive impulse, a strong positive impulse, and a weak negative impulse. This set of impulses records a dot at the first receiving-station, a dot at the second receiving-station, and a dash at the third receiving-station, as above described. Proper sets of impulses for all possible permutations by three of a dot, a dash, and a space can be formed in like manner. The receiving operators at the several stations write out the messages from their respective receiving-tapes by hand or machine for delivery to the proper addresses.

Instead of having the recording instruments 23 24 25 in branches connected with the subdivisions "29" there could be a printing-magnet in each subdivision for printing on an ordinary sheet of paper, and in that case there need be twenty-seven magnets, nine of which would print dots, nine of them dashes, and nine of them would simply operate the space-feed. This arrangement might be desirable where the receiving-stations are provided with telegraphic type-writers with readily-changeable type. Instead of changing the type, moreover, the operator could simply assign nine letters to the indication of a dot, nine to a dash, and nine to a space.

Instead of putting the sets of impulses to line by a key 5 a tape 82, Fig. 16, can be provided and used to control the impulses. In Fig. 16 the tape 82 runs over a metal cylinder 83, connected with the main line 3, and whenever holes in the tape run under any one of the spring-fingers 84 85 86 87, (connected with different parts of battery 2, grounded at the middle,) the proper pole of the proper number of cells to give the requisite current is put to line. As shown, the set of impulses is being sent, which consists of a weak positive, (finger 86,) a strong positive, (finger 87,) and a weak positive, (finger 86,) and which (as before seen) can print a dot at the first receiving-station of Fig. 1, a dash at the second, and a dot at the third. Proper positions of the holes for any and all the sets of impulses can easily be determined by the aid of Figs. 14 and 15.

Figure 17:
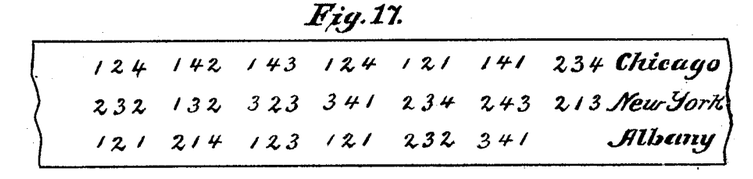
Fig. 17 is a view of a tape to serve as a guide to the transmitting operator with the messages of Fig. 10 inscribed thereon in another kind of element.
Figure 18:
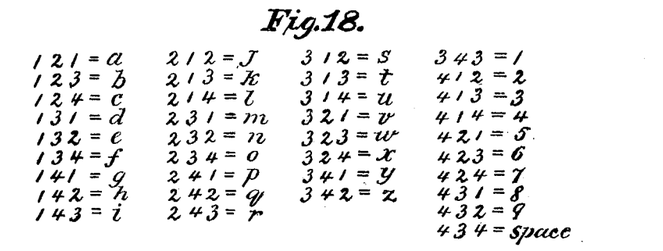
Fig. 18 is a chart of the symbols used in Fig. 17 and their interpretations.

In Figs. 17 and 18 the numerals 1, 2, 3, and 4 are shown as the elements of letters instead of the Morse symbols. Fig. 18 gives the alphabet and Fig. 17 shows a transmitting-tape written out after the manner of Fig. 10. Single spaces are shown between the letters; but as each letter is composed of the same number of elements this is less important. It is obvious that if the letter elements are increased the apparatus should be extended in accordance with the principles hereinbefore set forth.

Figure 19:
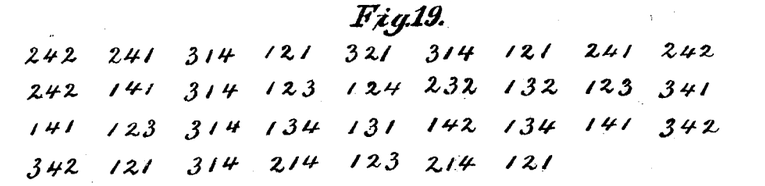
Fig. 19 is a sheet containing the messages of Fig. 10 as a secret writing for the transmission of intelligence within the invention.

Intelligence can be communicated independently of the telegraph—for example, by letter in cipher—by the use of any suitable indicia admitting of two or more independent translations. Thus let the twenty-seven numbers "121" to "343," Fig. 18, represent the different permutations of which the dot, dash, and space are capable as given in the vertical columns of Fig. 14, column by column, then the three messages—namely, the words "Chicago," "New York," "Albany"—written in Morse symbols in Fig. 10 would be expressed in said numbers, as in Fig. 19, which is to be read by lines horizontally from left to right, as usual in writing or printing. One person who should be informed that the numbers "121, 123, 124, 131, 234, 241, 242, 324, 341" each stood for the dot in the Morse alphabet, while the numbers "142," "143," "212," "213," "243," "312," "313," "342," and "343" each represented a dash in that alphabet, and the remaining nine numbers ("132," "134," "141," "214," "231," "232," "314," "321," and "323") each represented a space, might be able to read the message, (Chicago,) while another could be so instructed as to understand New York, and a third Albany. A person without a clue would have great difficulty (if able at all) to decipher even one, much less all the meanings. Such a sheet could be sent by mail or messenger to one or more operators for sending telegraphically in any known or suitable way according to one or more of the meanings, or it could be sent to any person for any desired purpose.

Instead of recording the symbols at the receivers or receiving-stations they may be indicated otherwise, as by audible or unrecorded visual indications.

Figure 9:
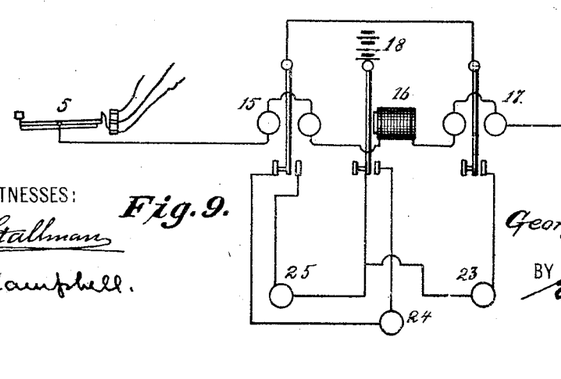
Fig. 9 is a diagram view of a modified arrangement of the receiver.

As above described, the dot, the dash, and the space are recorded by the aid of currents which differ from each other in character, as in polarity or strength, or both, in conformity with the character of the letter element to be recorded thereby, and other letter elements in place of such symbols can be recorded by the aid of such currents. Further, for recording the signals the paper-feed is controlled by the signaling-currents. So far as I am aware, this mode of recording transmission, with or without such control of a paper-feed, is new in general, as well for the transmission to a single station as to two or more stations. For transmission to a single station or receiver recording instruments (the recording instruments 23 24 25, for example) could be placed in branches of the local receiving-battery 18, (see Fig. 9,) the selectable magnets 19 20 21 22 and the recording-battery 26, with the circuit 33, its twenty-seven branches, twenty-eight subbranches, and twenty-nine subdivisions, being dispensed with.

With only three recording instruments (as 23 24 25, for example) it would of course suffice to have relays responding to only three conditions of the main line.

By the use of currents varying in character (as distinguished from currents varying in duration, as in the ordinary Morse transmission) the speed of transmission is increased, since the dash requires no more time than a dot. By a key transmitting instrument sending a succession of currents of suitable variation, as illustrated in Fig. 1, a number of letter elements can be sent by a single movement of the finger, the same as in the transmission to a number of receivers or receiving-stations.

I claim as my invention or discovery—

1. The improvement in telegraphy consisting in transmitting over a line to different receivers or receiving-stations electrical impulses in sets or groups, to each of which sets or groups is given a number of meanings, and translating at each receiver or receiving-station after the manner appropriate thereto the sets or groups transmitted to all, so that a number of messages may be transmitted and received simultaneously at different stations, substantially as described.

2. The improvement in telegraphy consisting in transmitting over a line to different receivers or receiving-stations electrical impulses differing from one another in polarity or strength or both and transmitted in sets or groups, to each of which sets or groups is given a number of meanings, and translating at each receiver or receiving-station after the manner appropriate thereto the sets or groups transmitted to all, so that a number of messages may be transmitted and received simultaneously at different stations, substantially as described.

3. The improvement in telegraphy consisting in transmitting over a line to different receivers or receiving-stations electrical impulses in sets or groups which correspond severally with different letter elements and when taken together in appropriate number represent different letters, and translating at each receiver or receiving-station after the manner appropriate thereto the sets or groups transmitted to all, so that a number of messages may be transmitted and received simultaneously, substantially as described.

4. The improvement in telegraphy consisting in transmitting over a line to different receivers or receiving-stations electrical impulses differing from one another in polarity or strength or both and transmitted in sets or groups which correspond severally with different letter elements and when taken together in appropriate number represent different letters, and translating at each receiver or receiving-station after the manner appropriate thereto the sets or groups transmitted to all, so that a number of messages may be transmitted and received simultaneously, substantially as described.

5. The improvement in telegraphy consisting in transmitting over a line to different receivers or receiving-stations electrical impulses in sets or groups which correspond severally with different Morse symbols and when taken together in appropriate number represent different letters, and translating at each receiver or receiving-station after the manner appropriate thereto the sets or groups transmitted to all, so that a number of messages may be transmitted and received simultaneously, substantially as described.

6. The improvement in telegraphy characterized by the transmission to different receivers or receiving-stations over a line of impulses representing combinations of symbols appertaining to different messages whereby the different receivers or receiving-stations may derive different messages from the same impulses by appropriating different ones of the symbols represented in combination by the impulses, substantially as described.

7. The improvement in telegraphy characterized by the transmission to different receivers or receiving-stations over a line of impulses representing combinations of symbols and the translation with the same meaning at each receiver or receiving-station of impulses representing those combinations which embody the same symbol for that particular receiver or receiving-station, substantially as described.

8. The improvement in telegraphy characterized by the transmission to different receivers or receiving-stations over a line of impulses representing combinations of dots, dashes and spaces and the translation with the same meaning at each receiver or receiving-station of impulses representing those combinations which embody the same symbol for that particular receiver or receiving-station, substantially as described.

9. The improvement in telegraphy characterized by the transmission to different receivers or receiving-stations over a line of impulses representing combinations of symbols and the indicating at each receiver or receiving-station of only the symbols of the respective combinations appropriate to said receiver or station, substantially as described.

10. The improvement in telegraphy characterized by the transmission to different receivers or receiving-stations over a line of impulses representing combinations of symbols and the recording at each receiver or receiving-station of only the symbols of the respective combinations appropriate to said receiver or station, substantially as described.

11. The improvement in telegraphy characterized by the transmission to different receivers or receiving-stations over a line of impulses representing combinations of dots, dashes and spaces, and the recording at each receiver or receiving-station of only the symbols of the respective combinations appropriate to said receiver or station, substantially as described.

12. The improvement in telegraphy, consisting in writing messages in parallel lines and sending to different receivers or receiving-stations impulses representing combinations of the respective symbols which occur in columns transverse to said lines, whereby each receiver or receiving-station may derive from said impulses the symbol in each combination corresponding to the message for it, substantially as described.

13. The improvement in telegraphy, consisting in writing messages in dots, dashes and spaces in parallel lines and sending to different receivers or receiving-stations impulses representing combinations of the respective symbols which occur in columns transverse to said lines, whereby each receiver or receiving-station may derive from said impulses the symbol in each combination corresponding to the message for it, substantially as described.

14. The improvement in telegraphy, consisting in sending over a line to different receivers or receiving-stations electrical impulses in sets or groups of three impulses at a minimum to each set or group, to each of which sets or groups is attached a number of meanings, and translating at each receiver or receiving-station after the manner appropriate thereto the sets or groups transmitted to all, so that a number of messages may be transmitted and received simultaneously, substantially as described.

15. The improvement in telegraphy, consisting in sending over a line to different receivers or receiving-stations, electrical impulses in sets or groups of three impulses at a minimum to each set or group, to each of which sets or groups is attached a number of meanings and controlling the indicating devices at the respective receivers or receiving-stations so that the same indication is made at any given receiver or receiving-station, by a number of such sets or groups of impulses, the sets or groups which make a given indication at one station being arranged in part to make another indication or indications at the other station or stations, substantially as described.

16. The improvement in telegraphy, consisting in sending over a line to a minimum of three receivers or receiving-stations electrical impulses in sets or groups of three impulses at a minimum to each set or group and each set or group representing a combination of a minimum of three symbols, one for each receiver or receiving-station, and at each receiver or receiving-station deriving the same signal from a minimum of nine such sets or groups, the nine sets or groups which give the same signal at any one receiver or receiving-station giving like and unlike signals at the other stations, substantially as described.

17. The improvement in communicating intelligence consisting in transmitting to different receivers electrical impulses in sets or groups, to each of which sets or groups is attached a number of meanings, and translating at each receiver after the manner appropriate thereto the sets or groups transmitted to all, so that a number of messages may be transmitted and received simultaneously, substantially as described.

18. The improvement in communicating intelligence characterized by embodying a number of messages in sets or groups of indicia, each of which sets or groups presents a number of meanings belonging respectively to the several messages, whereby the same sets or groups can be read differently in order to reproduce the different messages, substantially as described.

19. The improvement in communicating intelligence characterized by embodying a number of messages in sets or groups of indicia, in which the several indicia appertain, although in different manner, to each message, substantially as described.

20. The improvement in telegraphy, consisting in recording the elements of letters, each element by its own recorder, by the aid of currents which differ from each other in character, different elements being represented by currents differing in character as aforesaid, substantially as described.

21. The improvement in telegraphy, consisting in recording the elements of letters, each element by its own recorder, by the aid of currents which differ from each other in character, and controlling the feed of the paper on which the record is made by the same currents which make the record, different elements being represented by currents differing in character as aforesaid, substantially as described.

22. The improvement in telegraphy, consisting in recording the elements of letters, each element by its own recorder, by the aid of currents which differ from each other in character, and which are sent in sets or groups by the depression of finger-operated devices, different elements being represented by currents differing in character as aforesaid, substantially as described.

23. The improvement in telegraphy, consisting in sending over a line to different receivers or receiving-stations, electrical impulses in sets or groups of three impulses at a minimum to each set or group, to each of which sets or groups is attached a number of meanings and controlling the recording devices at the respective receivers or receiving-stations so that the same record is made at any given receiver or receiving-station, by a number of such sets or groups of impulses, the sets or groups which make a given record at one station being arranged in part to make another record or records at the other station or stations, substantially as described.

24. The improvement in telegraphy, consisting in recording simultaneously at different receivers or receiving-stations the elements of letters, by the aid of currents which differ from each other in character, different elements being represented by currents differing in character and each element being recorded by its own recorder, whereby different letter elements may be recorded simultaneously at different receivers or receiving-stations, substantially as described.

25. The improvement in telegraphy, consisting in recording letter elements in the form of dots, dashes and spaces, by the aid of currents of three different characters as a minimum, the three letter elements being represented by currents differing in character, substantially as described.

26. The improvement in communicating intelligence, characterized by embodying a number of messages systematically in sets or groups of indicia, each of which sets or groups represents a number of symbols belonging respectively to the several messages and corresponding with less than an entire word in each message, substantially as described.

27. The improvement in communicating intelligence, characterized by embodying a number of messages systematically in sets or groups of indicia, each of which sets or groups represents a number of letter elements belonging respectively to the several messages, substantially as described.

In testimony whereof I have signed my name to this specification in the presence of two subscribing witnesses.

GEORGE ALEXANDER CARDWELL.

Witnesses:
   GEO. E. CRUSE,
   DONALD CAMPBELL.